United States Patent [19]

Lee

[11] Patent Number: 5,414,699
[45] Date of Patent: May 9, 1995

[54] METHOD AND APPARATUS FOR RECEIVING AND DECODING COMMUNICATION SIGNALS IN A CDMA RECEIVER USING PARTIAL DE-CORRELATION

[75] Inventor: Edward K. B. Lee, Sunrise, Fla.

[73] Assignee: Motorola, Inc., Schaumburg, Ill.

[21] Appl. No.: 126,865

[22] Filed: Sep. 27, 1993

[51] Int. Cl.$^6$ .............................................. H04J 13/00
[52] U.S. Cl. ...................................... 370/18; 370/69.1; 375/206
[58] Field of Search .............................. 370/18, 19–22, 370/69.1; 380/34, 33; 375/1, 99, 102, 103, 34

[56] References Cited

U.S. PATENT DOCUMENTS

| | | | |
|---|---|---|---|
| 5,099,493 | 3/1992 | Zeger et al. | 370/18 |
| 5,101,417 | 3/1992 | Richley et al. | 370/18 |
| 5,235,612 | 8/1993 | Stilwell et al. | 370/18 |
| 5,272,721 | 12/1993 | Minoshibu et al. | 370/18 |

Primary Examiner—Douglas W. Olms
Assistant Examiner—Ajit Patel
Attorney, Agent, or Firm—M. Mansour Ghomeshi

[57] ABSTRACT

In an adaptive CDMA receiver (20), a Direct Sequence Spread Spectrum (DS-SS) received signal and a reference signal are equalized by minimizing the error between them. The received signal includes a desired DS-SS communication signal comprising binary bits coded with spreading chip sequences. The received signal is sampled at a chip rate to produce sampled received signals which are correlated with each other. The received samples are partially de-correlated by employing an orthogonal transformation algorithm to provide de-correlated subspace elements and correlated subspace elements. The adaptive equalization process is based on de-correlated and correlated subspace elements. Tap coefficients of a despreading equalizer (400) are updated for the de-correlated and correlated elements individually and collectively, respectively. This selective updating of tap coefficients provides for fast convergence and minimum error.

18 Claims, 6 Drawing Sheets

METHOD AND APPARATUS FOR RECEIVING AND DECODING COMMUNICATION SIGNALS IN A CDMA RECEIVER USING PARTIAL DE-CORRELATION

TECHNICAL FIELD

This invention relates in general to the field of communication systems and more particularly to a direct sequence code division multiple access (DS-CDMA) communication system.

BACKGROUND

Code division multiple access (CDMA) communication systems are used extensively in satellite communications with military and commercial applications. These systems are also known as CDMA spread spectrum communication systems because the communicated information is spread over a wide allocated frequency spectrum and the frequency spectrum can be re-used multiple times.

Because CDMA modulation techniques are inherently more susceptible to fading conditions generally present at the terrestrial and land mobile environments, their application has been limited to satellite communications. However, with recent advancements in digital signal processing capability, CDMA communication systems are becoming increasingly popular in terrestrial land mobile environments. For example, recent developments have allowed CDMA systems to be used in cellular telephone environments.

In general, there are two types of CDMA communication systems. One is known as a frequency hopping CDMA system where the wide allocated spectrum is divided into a substantial number of narrower frequency bands, wherein an information signal is switched or "hopped" over these frequency bands in accordance with a predetermined code. The other CDMA system is known as a direct sequence CDMA communication system (DS-CDMA) where the user information signals, in the form of binary bits, are spread over the allocated frequency spectrum by combining them with spreading codes known as pseudo-random noise (PN) codes. The spreading code comprises a predetermined sequence of binary states known as chips. Conventionally, the CDMA transmitters produce DS-SS communication signals by multiplying user information bit sequences by the spreading chip sequences which are identified with particular receivers. In typical CDMA communication systems, the receivers have prior knowledge of the spreading chip sequences directed at them and decode the DS-SS communication signal based on the known spreading chip sequences.

CDMA receivers, in addition to receiving a desired DS-SS signal, also receive multiple-access DS-SS interfering signals. When there is a large power disparity between the desired signal and the interfering signals, non-zero cross-correlations among the spreading sequences give rise to a phenomenon known as the "near-far" problem. In near-far situations, higher power interfering signals overwhelm the lower power desired signal significantly, thus degrading reception quality at the receiver. One conventional approach to improving the near-far problem uses a power control scheme where the powers from the receivers are fed back to control the interfering transmitter's power as to remove the power disparity. In another solution, PN codes are constructed to be orthogonal to each other. Orthogonal codes produce zero cross-correlation over a predetermined time interval among the desired and interfering chip sequences. As such, interfering signals with orthogonal chip sequences become suppressed during the demodulation process at the receivers.

A more recent approach proposes an adaptive despreading or demodulation process. In an adaptive CDMA system, the receiver is enabled to suppress multiple access interference using adaptive equalization methods. The equalization methods utilize minimum mean square error (MMSE) criterion, whereby a transmitted training bit sequence coded with a spreading chip sequence is equalized with an uncoded reference sequence. In such a system, CDMA transmitters transmit a training bit sequence and the receivers adaptively determine, based on the training sequence, the despreading codes by converging or minimizing the error between the received training bit sequence and the reference bit sequence. Adaptive determination of the despreading chip sequence and suppression of multiple access interference allows a significant number of users to communicate with each other over a spread spectrum channel without requiring prior knowledge of system parameters or power control mechanism.

For adaptive implementation of interference suppression based on the MMSE criterion, either one of the least mean square (LMS) or recursive least mean (RLS) algorithms may be employed. These algorithms utilize mathematical computation and matrix operations to minimize the error between the received training sequence and the reference bit sequence. However, the LMS algorithm is known to have a slow convergent rate when an interfering signal is significantly stronger than the desired signal. On the other hand, the recursive least square (RLS) algorithm has a faster convergent rate than the LMS algorithm, and the convergent rate of the former algorithm does not depend on the ratio of interfering signal to the desired signal. However, the RLS algorithm cannot be used in the DS-CDMA case when the number of transmitters is less than the number of chips and noise power is relatively small with respect to the signal power. These conditions produce a received input correlation matrix with zero or near-zero Eigen values. An input correlation matrix is defined as a weighted sum of matrix produced by the product of an input vector by its own transposed vector. These zero or near-zero Eigenvalues cause an eventual divergence in the error minimization process using RLS algorithm.

In mobile communication environments, it is required to quickly track varying channel characteristics and to provide a fast communication links. As explained above, the conventional LMS approaches for converging and minimizing the error between the reference signal and the received signal are time consuming. Therefore, there exists a need for accelerating adaptive equalization process, whereby error minimization could be achieved in a significantly shorter period of time than is achievable by conventional methods which use the LMS algorithm.

SUMMARY OF THE INVENTION

Briefly, according to the invention, a CDMA receiver incorporates a method and an apparatus for adaptively decoding Direct Sequence Spread Spectrum (DS-SS) communication signals by minimizing error between a received DS-SS signal and a reference signal.

The received signal includes a desired signal comprising binary bits coded with a spreading chip sequence. The received signal is sampled at the chip rate to produce received samples which are correlated with each other. The received samples are partially de-correlated by employing an orthogonal transformation algorithm to provide a first subspace having de-correlated elements and a second subspace having correlated elements. The error is minimized by equalizing the de-correlated and correlated elements individually and collectively, respectively, using either one of LMS or RLS algorithms.

DETAILED DESCRIPTION OF THE PREFERRED EMBODIMENT

Figure 1:
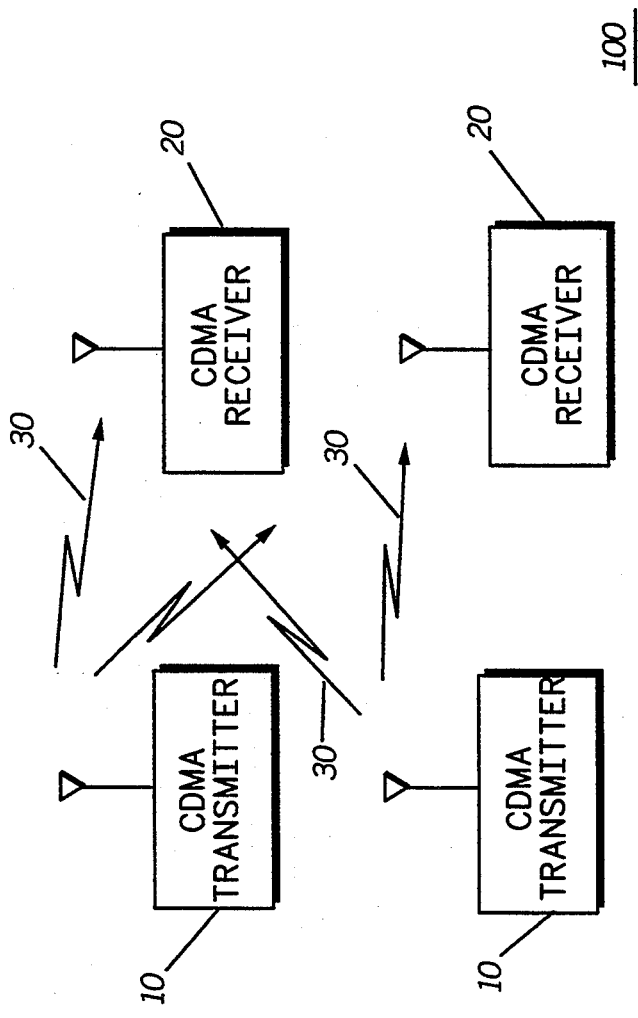
FIG. 1 is a diagram of a CDMA communication system.

While the specification concludes with claims defining the features of the invention that are regarded as novel, it is believed that the invention will be better understood from a consideration of the following description in conjunction with the drawing figures.

Referring to FIG. 1, a communication system 100 embodying the principles of the present invention is shown. The communication system 100 includes a plurality of CDMA transmitters 10 which transmit direct sequence spread spectrum (DS-SS) communication signals 30. The DS-SS communication signal 30 includes a baseband desired signal comprising binary bits coded with spreading chip sequence. The communication system 100 also includes a plurality of CDMA receivers 20 which receive the desired transmitted communication signals 30 along with other multiple access interfering signals from other CDMA transmitters. As such, the received communication signal, in addition to the desired signal, also includes at least one near interference signal and white random Gaussian noise. The received signals at the receivers 20 may be represented mathematically by:

$$R = \sum_{k=1}^{L} \sqrt{g_k} \, d_k P_k + N_n \quad (1)$$

where $g_k$, $d_k$, and $P_k$, respectively, represent the received power level of the kth user signal, the kth user data bit, the kth user spreading vector. $N_n$ denotes a zero mean Gaussian random noise. In Equation 1, L transmitters, including a desired transmitter, are assumed to be present, $P_1$ is assumed to represent the desired signal spreading sequence (or vector), and $d_1$ is the desired data bit which, as described later, takes on the value of either 1 or $-1$. Note that upper case characters are used to denote a vector or matrix.

The communication system 100 is an adaptive CDMA communication system whereby a despreading chip sequence is adaptively determined. The determined despreading chip sequence suppresses the multiple access interfering signals and decodes the desired signal. As described later in detail, the receiver 20 determines the despreading chip sequence or vector during a training interval by minimizing the error between the received signal and a reference signal, which corresponds to the desired signal. The error is minimized by minimizing the mean squared error (MSE) at the receiver 20 which is described as:

$$MSE = E[(W^T R - d_1)^2] \quad (2)$$

Where E refers to averaging operator and W is the receiver's despreading vector. The vector W is a despreading vector which despreads the received DS-SS communication signal and minimizes MSE.

It should be noted that the adaptive error minimization during training is performed asynchronously, i.e., without bit timing or chip timing synchronization of the receiver and the transmitter. This is because performing synchronization of any kind in the presence of interfering signals is close to impossible. Thus, a redundant non-alternating training bit sequence is transmitted to circumvent the need for synchronization while the despreading chip sequence is being determined during the training interval.

Figure 2:
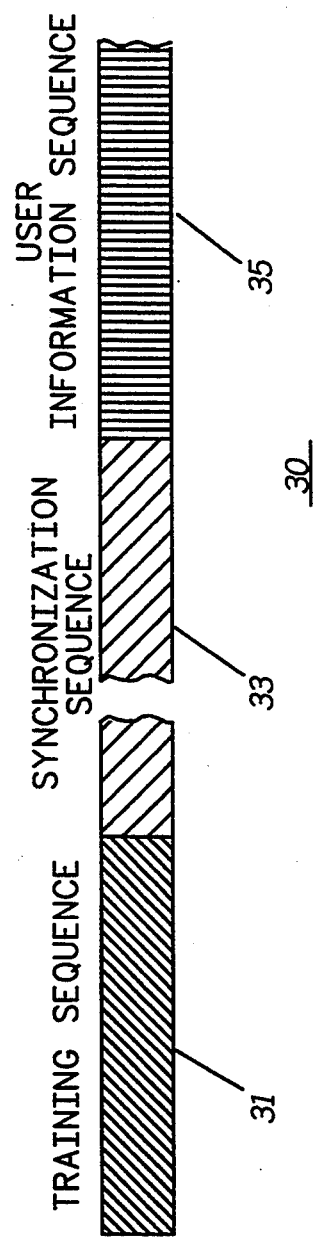
FIG. 2 is timing diagram of a DS-SS communication signal according to the present invention.

Referring now to FIG. 2, a timing diagram of a desired transmitted DS-SS communication signal 30 from the transmitter 10 of FIG. 1 is shown. The DS-SS communication signal 30 comprises a string of radio frequency modulated bits which are coded with a desired spreading chip sequence. The bits and the chips are binary signals assuming one of two states of $+1$ and $-1$ represented by voltage potentials of $V_{+1}$ and $V_{-1}$ respectively. The $V_{+1}$ and $V_{-1}$ potentials are of equal magnitude but opposite polarity. At the start of the DS-SS signal 30, a redundant training sequence 31 is transmitted, which is used by the receiver 20 to adaptively determine despreading chip sequence. In the preferred embodiment of the invention, the training bit sequence comprises a predetermined redundant bit sequence having non-alternating and continuous bit states, such as a sequence of consecutive $+1$ bit states. The training sequence 31 is followed by a transmitter synchronization sequence 33 which is used to synchronize receiver and transmitter bit timing. Preferably, the synchronization of the receiver and the transmitter follows the training interval because the adverse effects of the interfering signals are canceled at this stage, thus allowing for synchronization to take place. Following the transmitter bit timing sequence 33, a user information sequence 35 comprising user generated data is transmitted. The user-generated data may, for example, be digitized voice or raw binary data for use in a computing device.

Figure 3:
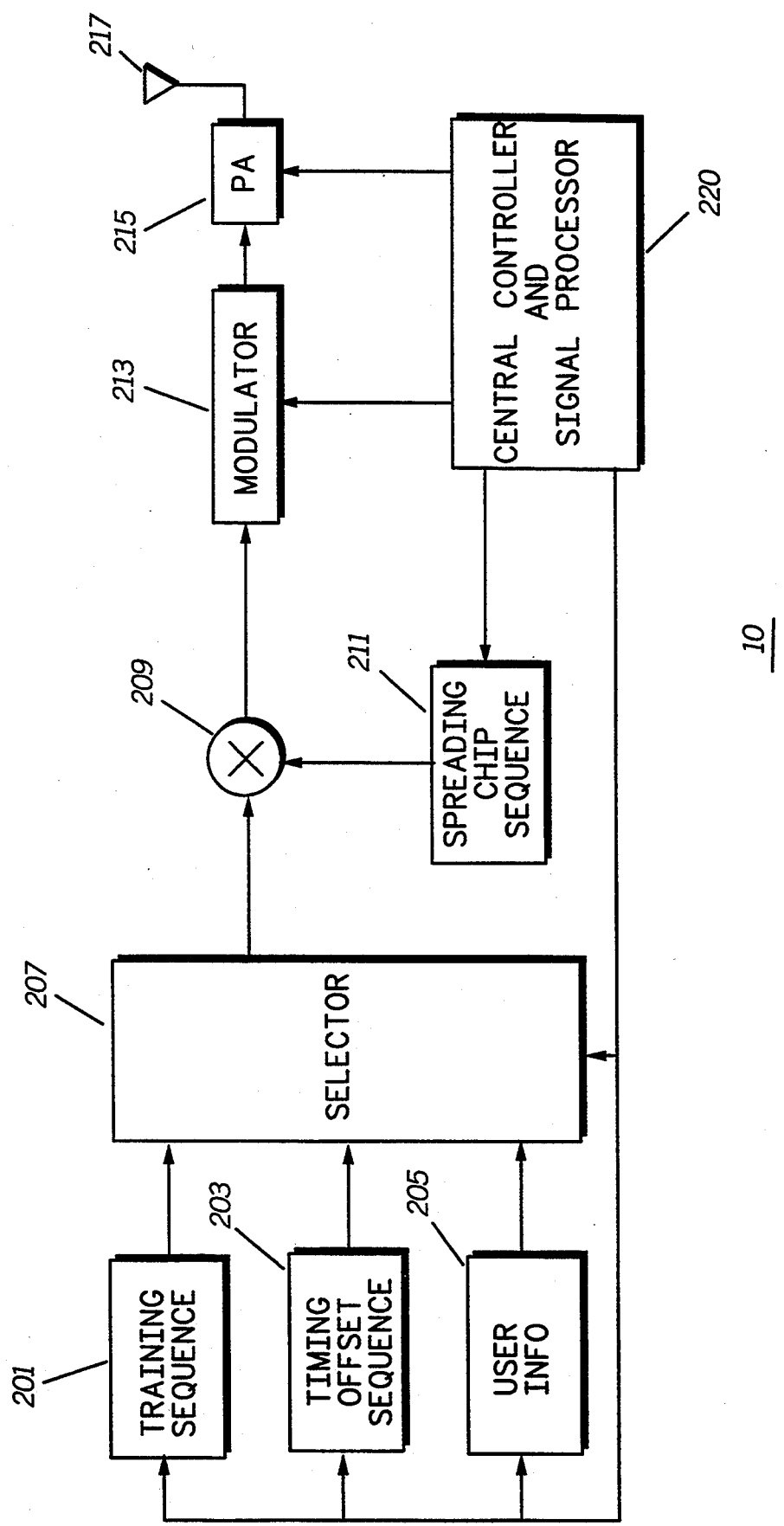
FIG. 3 is a block diagram of a CDMA transmitter used in communication system of FIG. 1.

Referring now to FIG. 3, a blocked diagram of the CDMA transmitter 10 is shown. The CDMA transmitter 10, includes a central controller and signal processor block 220 which controls the entire operation of the transmitter 10, including signal processing necessary for modulating and generating the spreading chip sequence. The transmitter 10, includes a training sequence block 201 which generates the predetermined training sequence. The transmitter 10 also includes a transmitter synchronization sequence generator block 203 which generates the transmitter bit timing sequence following the training sequence. Finally, a user information sequence block 205 provides user information in the form of binary bit sequences. The user information may originate from a variety of sources, such as from a voice coder which receives voice information from a microphone, or it may comprise raw data information generated from a computing device. A selector block 207, under the control of the central controller and processor block 220, provides for selecting one of the training, bit timing or user information sequences in proper order and applies it to a multiplier 209. A spreading chip sequence generator block 211 generates the spreading chip sequence to be combined with the bit sequence to be transmitted to the receiver. Preferably, the generated spreading chip sequence comprises well-known gold PN codes having desirable cross-correlation and auto-correlation properties. The spreading chip sequence has a predetermined number of chips (n) for coding each bit of the transmission sequences. The multiplier 209 multiplies one of the transmission sequences by the spreading chip sequence and applies it to a modulator 213. Modulator 213 may comprise a number of well-known binary signal modulators, such as binary phase shift keying (BPSK) or quadrature phase shift keying (QPSK) modulators. Output of the modulator 213 is applied to a power amplifier 215 which amplifies the modulated signal and applies it to an antennae 217 for transmission. It may be appreciated that the block 220 and some of the other blocks described in conjunction with transmitter 10 may be implemented utilizing one or more of the well-known digital signal processors, such as the DSP 56000 series manufactured by Motorola, Inc.

Figure 4:
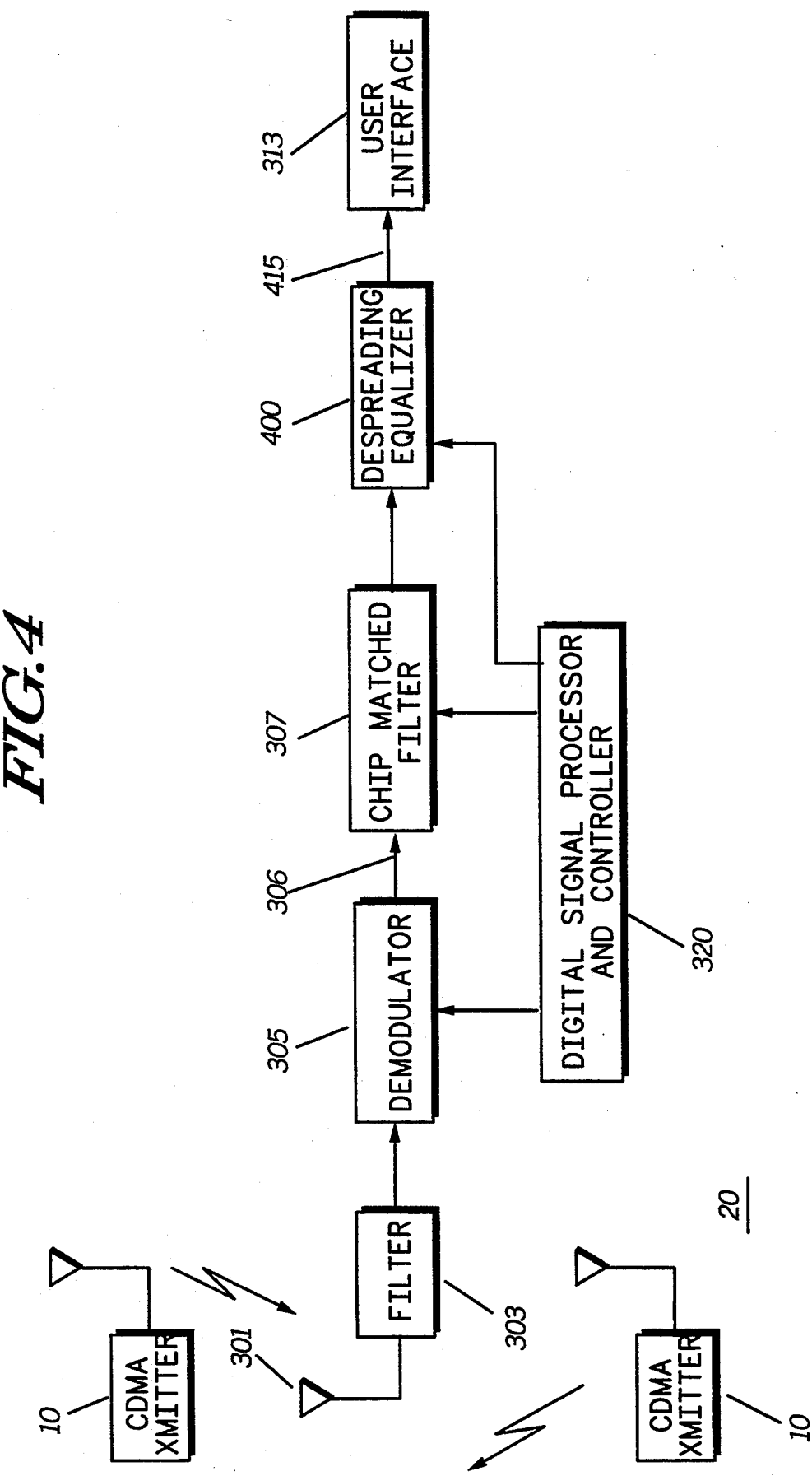
FIG. 4 is a block diagram of a CDMA receiver according to the present invention.

Referring now to FIG. 4, the block diagram of the CDMA receiver 20 is shown. The receiver 20 receives the received communication signal which includes the desired DS-SS communication signal as contaminated by the interfering DS-SS signals and noise. The received communication signal is received at the antennae 301 and is applied to a preselector filter 303 which provides the initial receiver selectivity. The filtered signal is applied to a well-known baseband demodulator 305. The baseband demodulator 305 comprises a well-known demodulator that demodulates the communication signal in accordance with the modulation scheme used in the transmitter 10 to provide a baseband signal 306. The baseband signal 306 is applied to a well-known chip matched filter block 307. The chip matched filter comprises a well-known integrate-and-dump filter block where the received DS-SS communication signal is sampled and integrated at chip rate and the result is dumped at the end of each chip interval. The output of the chip matched filter is applied to a despreading equalizer 400 which, based on the training sequence, adaptively determines the despreading chip sequence vector W. As described later in detail, the despreading equalizer provides despreading chip vector W by adaptively equalizing the received signal with an uncoded pre-stored reference signal corresponding to the training bit sequence. A signal processor and controller block 320 performs all necessary signal processing requirements for the receiver 20. The equalizer 400 despreads the DS-SS communication signal at the output of the chip matched filter 307 and provides a decoded communication signal at its output (415). The decoded communication signal is applied to a user interface block 313 which may comprise one of a number of user interface devices such as a speaker, a computing device, a data display or a fax or voice mail machine.

Figure 5:
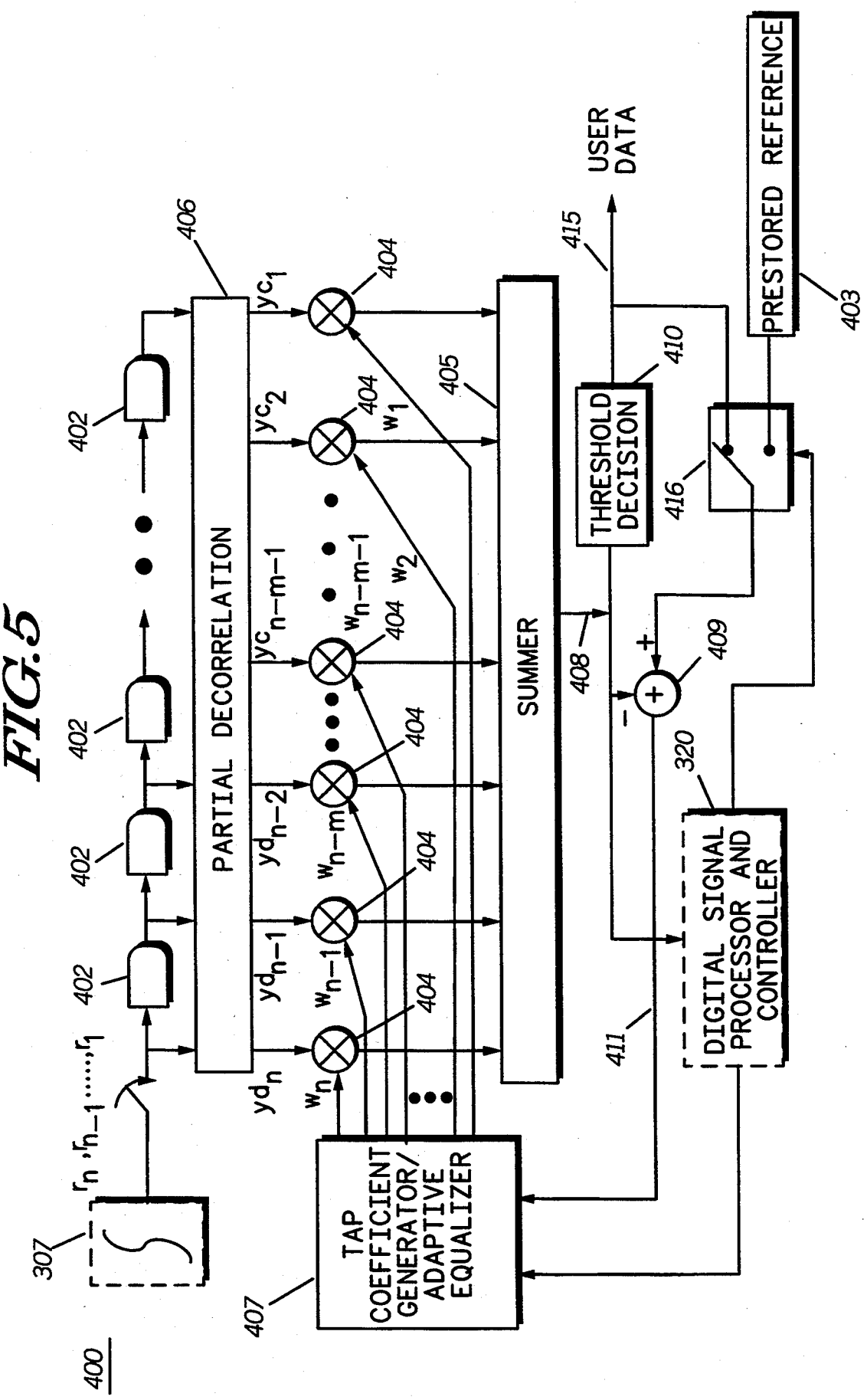
FIG. 5 is a block diagram of a spreading equalizer used in the receiver of FIG. 4.

Referring now to FIG. 5, a block diagram of the despreading equalizer 400 is shown. In the preferred embodiment, a Tapped Delay Line structure is used. The equalizer 400 comprises an n-tap delay line where, as mentioned before, n is the number of chips per bit in the spreading chip sequence. The tap delay line consists of a bank of n−1 serially coupled flip-flops 402 with their outputs coupled to a corresponding number of multipliers 404 via a partial de-correlator 406. The bank of serially coupled flip-flops 402 operates as a shift register sequentially shifting at the chip rate, received samples $r_1, r_2, \ldots r_n$ which are provided at the output of the chip matched filter 307 during each bit interval. The received samples $r_1, r_2, \ldots r_n$ are herein represented by the received sample vector R whose mathematical expression is given by equation (1). It may be appreciated that because the training bit sequence and the interfering signals are coded with spreading chip sequences, the elements of the received sample vector R, i.e., $r_1$–$r_n$, are correlated with each other. According to the present invention, the received samples $r_1$–$r_n$ are partially de-correlated, via the de-correlator 406, such that some of the output elements are de-correlated and others remain correlated. Based upon the partially de-correlated elements the error between the received signal and the desired signal is minimized. As such, the outputs of the flip-flops 402 are applied to block 406 for partially de-correlating the received samples $r_1$–$r_n$. The output of block 406 provides de-correlated elements $y_n^d, y_{n-1}^d, \ldots, Y_{n-m}^d$ which hereinafter are represented by a de-correlated subspace vector Y1. The output of block 406 also provides correlated elements $y_{n-m-1}^c, \ldots y_2^c$, and $y_1^c$ which hereinafter are represented by a correlated subspace vector Y2. The partial de-correlator block 406 utilizes an orthogonal transformation algorithm to transform the received sample vector R. Well-known orthogonalization transformation algorithms may be used to de-correlate the received sample vector R. Such algorithms include Eigenvalue transformation and Gram-Schmidt orthogonalization.

At the end of each bit interval, the multipliers 404 multiply the resulting de-correlated and correlated elements by tap coefficients $w_1, \ldots w_n$ as provided by a tap coefficient generator block 407. The tap coefficient $w_1, \ldots w_n$ is represented by the despreading vector W, the finding of which satisfies equation (2) and minimizes the error between the received signal as represented by the vector R and the desired signal $d_1$. The desired signal is represented in the equalizer 400 by a pre-stored reference bit sequence provided by block 403, which corresponds to the training sequence. A summer 405 sums the outputs of the multipliers 404 to provide the summer output 408. The summer's output 408 is applied to a adder/subtracter 409 and a threshold decision block 410. The threshold decision block 410 comprises a threshold comparator which, after the training interval, provides the detected bits of the user bit sequence. The threshold decision block 410 provides the equalizer output 415. The threshold detector decision block 410 determines the decoded bit state by comparing the summer output 408 with a bit state threshold level. It may be appreciated that the equalizer output 415 and the summer output 408 are related by a (1/n) ratio therebetween. During training, the adder/subtracter 409 compares the summer's output 408 with the pre-stored reference bit sequence as provided by the block 403. During training the output of the prestored reference 403 is coupled to the adder/subtracter 409 via switch 416.

Once the training has been completed, switch 416 changes position to allow the output 415 to provide the reference for the adder/subtracter 409.

The pre-stored reference sequence is a pre-determined reference signal representing uncoded training sequence. As mentioned before, this is a continuous and non-alternating sequence of 1 or −1. The adder/subtracter 409 compares the pre-stored reference bit sequence with the summer output and provides an error signal 411 which is applied to a tap coefficient generator block 407. The tap coefficient generator block 407 uses either the Least Means Square (LMS) or Recursive Least Square (RLS) algorithm to update tap coefficients $w_1-w_n$ during each bit interval and to minimize the error signal 411. The despreading equalizer 400 updates the tap coefficient $w_1-w_n$ until the error signal between the detected bit sequence and the pre-stored training sequence is minimized and the received signal and the reference signal are substantially converged and equalized. Once equalized, the transmitted training bit sequence and the pre-stored reference bit sequence, the tap coefficients $w_1-w_n$ become a representation of the despreading chip sequence or vector W which despread the DS-SS communication signal 30 and suppress multiple-access interfering signals without prior knowledge of the spreading chip sequence. As such, the vector W represents the despreading chip sequence. As explained before, the elements of the vector W are used to despread the received DS-SS communication signal after the training interval has terminated.

Figure 6:
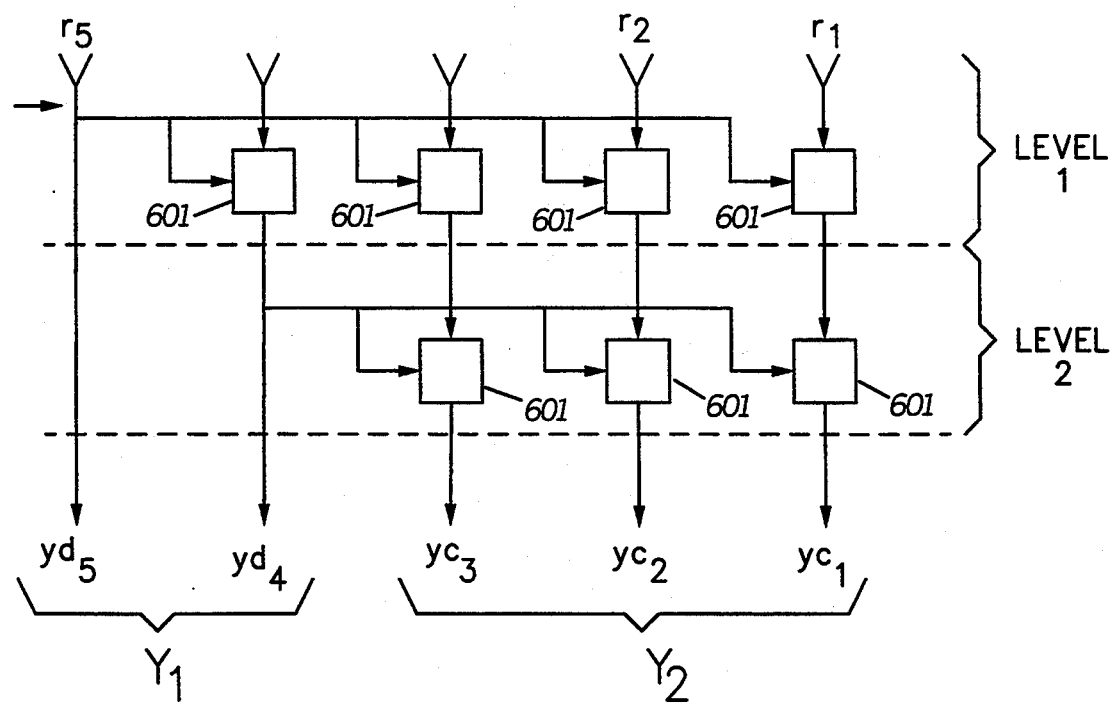
FIG. 6 is a block diagram of a de-correlator which uses Gram-Schmidt orthogonalization.

Referring to FIG. 6, block diagram of the preferred embodiment of the de-correlator 406 is shown. The partial de-correlator 406, according to the preferred embodiment of the invention, utilizes a parallel architecture for Gram-Schmidt orthogonal transformation which may be implemented using single or multiple digital signal processors. For a five chip sequence signal, the partial de-correlator 406 receives an input comprising the correlated received samples $r_1-r_5$ and provides an output comprising de-correlated elements $y_5^d$, $y_4^d$ (Y1) and correlated elements $y_3^c$, $y_2^c$, and $y_1^c$ (Y2).

As is well known, the Gram-Schmidt orthogonal transformation de-correlates each received sample from the remaining samples in consecutive levels. The de-correlation process basically removes from one received sample the affects of the remaining elements at each level using well-known mathematical computations. In FIG. 6, the received sample vector R, is inputted and is orthogonalized on an element-by-element basis. Referring to our earlier assumption of five elements for vector R at the first level, the transformation is applied to the vector R such that $r_1^1$ is orthogonal to the elements, $r_j^1$ for j from 2 through 5 (the superscripts represent the level of orthogonalization). This transformation may be expressed in a matrix form:

$$\begin{vmatrix} r_1^2 \\ r_2^2 \\ r_3^2 \\ r_4^2 \\ r_5^2 \end{vmatrix} = \begin{vmatrix} 1 & 0 & 0 & 0 & 0 \\ -w_2^1 & 1 & 0 & 0 & 0 \\ -w_3^1 & 0 & 1 & 0 & 0 \\ -w_4^1 & 0 & 0 & 1 & 0 \\ -w_5^1 & 0 & 0 & 0 & 1 \end{vmatrix} \begin{vmatrix} r_1^1 \\ r_2^1 \\ r_3^1 \\ r_4^1 \\ r_5^1 \end{vmatrix}$$

In the above matrix $w_j^1$ is set to:

$$w_j^1 = \frac{E[r_1^1 r_j^1]}{E[r_1^1 r_1^1]}$$

An element by element transformation continues until strong interfering signal have been de-correlated. In the embodiment of FIG. 6, two strong interfering signals have been assumed. Blocks 601 in FIG. 6 represent the computational processing that takes place at each level.

As explained earlier, the partial de-correlator 406 produces two subspace vectors, de-correlated subspace vector Y1 and correlated subspace vector Y2. The de-correlated subspace Y1 is spanned by some, including the high power interfering signals. The correlated subspace Y2 is associated with the remaining signals and noise. It is noted that noise includes the white random Gaussian noise and weak interfering signals which do not have a significant effect on the reception of a desired signal which may be considered as noise. In other words, far interfering signals which have a low signal strength may be treated as noise for the purpose of providing the two subspaces Y1 and Y2. The desired signal may be included in either of the subspaces Y1 or Y2.

With output vector Y divided into two separate subspaces, each subspace vector may be equalized using an optimum equalization technique. As was stated earlier, various equalization techniques are available for signals of differing characteristics. With vector Y divided into two distinct vectors, the equalizer may be optimized depending on which of the two subspace vectors Y1 or Y2 it is equalizing. In the preferred embodiment, the subspace Y2 which includes the correlated signals, is adaptively and collectively equalized using LMS algorithm. The slow convergence rate associated with the LMS algorithm is overcome by having the strong interfering signals removed from this subspace vector. This removal reduces the Eigenvalue ratio (the ratio of the maximum Eigenvalue to the minimum Eigenvalue) of the Y2 subspace which would ordinarily prevent the use of LMS algorithms. It is noted that the Eigenvalue ratio and Eigenvalue spread are interchangeably used in this document to refer to the same number. Therefore, the LMS algorithm may be used for the subspace Y2 without significantly increasing the convergence rate or compromising the minimization of error. The LMS algorithm used in equalizing the correlated vector Y2 updates the tap coefficients using a single optimal step size. This technique is well known in the art. An explanation of this technique may be found in Adaptive Filter Theory, by S. Haykin, published by Prentice Hall, New Jersey, 1986.

The subspace Y1 having de-correlated components is adaptively and individually equalized using either LMS or RLS algorithms. LMS may be used in the equalization of this subspace despite the presence of strong interfering signals. This is because the components of this subspace vector are de-correlated which provides for the use of optimal and independent step sizes in updating the tap coefficients of the tap delay line structure 400. This is in contrast with the LMS algorithm used for the correlated subspace Y2, where the same step size was used. On the other hand, RLS may be used in equalizing the components of the subspace vector Y1 due to their non-singularity. It has been determined that no significant difference in the convergence rate is realized by using the RLS or LMS with optimal step sizes for the de-correlated subspace Y1.

It has been further determined that the convergence rate of the LMS algorithm using partially de-correlated data (Y) improves as higher level de-correlated data is used. The reason is that the signal Eigenvalue spread decreases with a successive level of de-correlation. In reality, the first level of de-correlation removes the effect of the presence of the strongest signal in the received signal. Each subsequent level of de-correlation removes additional interfering signals. This process continues until all the strong interfering signals have been removed. The Eigenvalue spread is reduced as the effects of strong interfering signals is removed from the received signal. Once an optimum level of Eigenvalue spread has been established (this may be detected via a signal processor), the de-correlation process stops at which point the two subspace vectors Y1 and Y2 are formed.

As was stated earlier the convergence rate of the LMS algorithm is determined by the Eigenvalue ratio. Indeed, when the Eigenvalue ratio is close to one, the LMS with partially de-correlated data will converge as fast as the LMS with completely de-correlated data. Therefore, the incoming signal does not have to be completely de-correlated so long as the strong interfering signals are de-correlated. The partial de-correlation significantly improves the process and speed of recovering the chip sequence.

Figure 7:
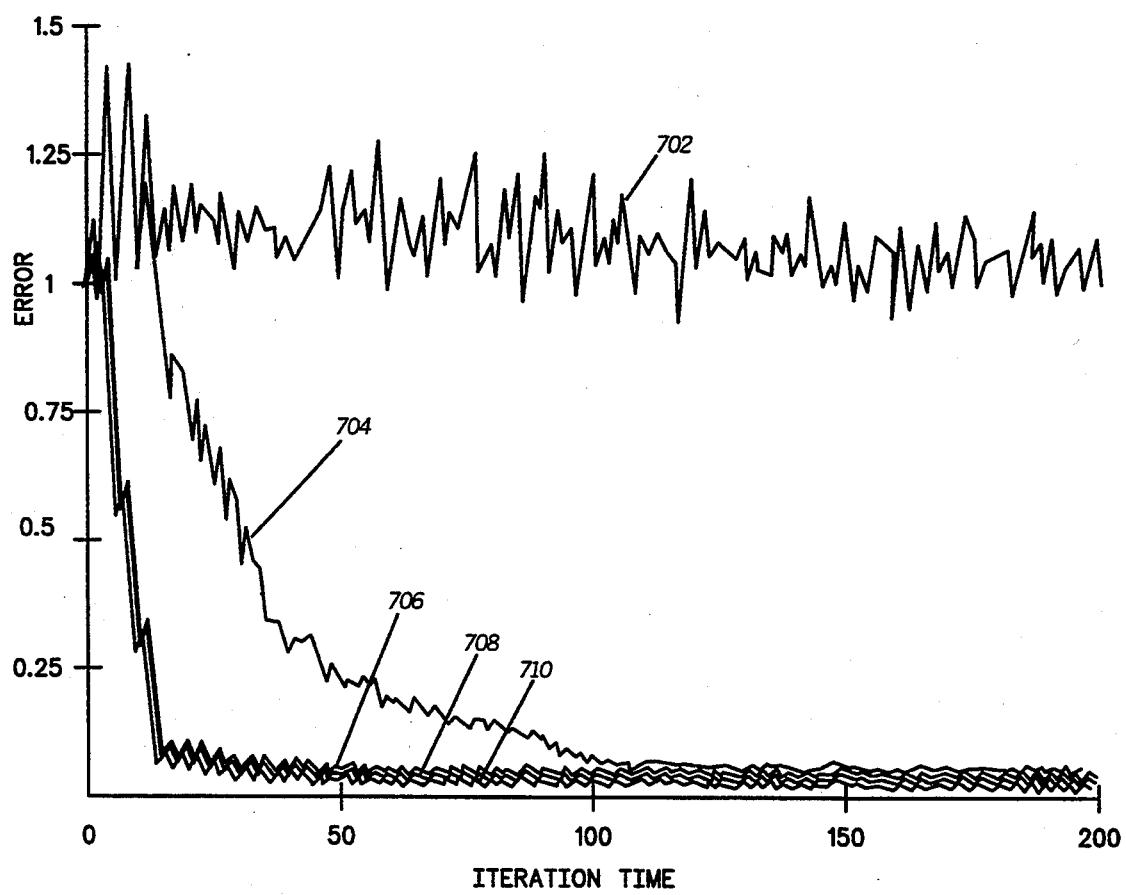
FIG. 7 is a graph representing partial de-correlation in accordance with the present invention.

Referring to FIG. 7, a number of graphs representing the benefits of partial de-correlation are shown. This figure shows four learning curves of the LMS algorithm with different levels of de-correlation. The X axis represents the iteration time. The Y axis represents the ensembled-average-squared error. Various level de-correlated data are employed in estimating a desired signal and updating coefficients using the LMS for performance comparison. For de-correlated elements the step size is optimized for each element and set to one quarter of the inverse of the power of each element. For correlated elements the step size is set to one quarter of the inverse of the maximum Eigenvalue ratio of the subspace vector Y2. Ensemble-averaged learning curves are generated by averaging 100 independent simulation runs. In these simulations five synchronous transmitters, one of which is the desired transmitter, are assumed to be present. These five transmitters are assigned to unique Gold Spreading sequences with period seven. The ratios of four interfering signal powers to the desired signal power are 1000, 10, 1, and 1. Graph 702 shows level zero with no de-correlation. As can be seen the convergence of this correlated signal is very long. Graph 704 shows a level one de-correlation. Level two, three, and four de-correlation are shown by graphs 706, 708, and 710, respectively. Level four represents a completely (totally) de-correlated signal.

As can be seen, the LMS with a level one de-correlation 704, where most of the strongest interfering signals are de-correlated, converges much faster that the LMS without any de-correlation 702. The LMS with a level one de-correlation 704 does not perform as well as the LMS with a higher level of de-correlation, graphs 706, 708, and 710. This is due to the fact that the Eigenvalue spread of the correlation matrix of correlated subspace Y2 elements after a level one de-correlation is larger than that of the correlation matrix after a higher level of de-correlation. As can be seen, the LMS with level two 706 and level three 708 de-correlation performs as well as the LMS with a complete de-correlation 710. This is because the Eigenvalue spread of the correlation matrix after level two and level three de-correlations is close to one another. In general, FIG. 7 demonstrates the lack of a significant difference between a completely de-correlated signal (level four 710) and a level two de-correlated (partially de-correlated) signal 706. It is this significant similarity between a partially de-correlated signal and a completely de-correlated signal that allows the use of a partial de-correlator without sacrificing performance. And the use of a partial de-correlator significantly accelerate the convergence rate. It is therefore concluded that total de-correlation is no longer necessary so long as the contribution of strong interfering signals have been removed from the received signal.

In summary, a method of recovering a DS-CDMA signal without prior knowledge of the spreading sequence and relative signal power level is disclosed. The method includes a preprocessing arrangement whereby the incoming signal is partially de-correlated. The strong interfering signals are de-correlated to form a subspace Y1. Other signals remain correlated to form another subspace Y2. With the strong interfering signals removed from the correlated subspace Y2, the LMS algorithm may be used with fast convergence rate. This is achieved due to the small Eigenvalue ratio that is obtained with the absence of strong interfering signals. The de-correlated subspace Y1 is equalized using either RLS or LMS. Either of these algorithms may be used since the de-correlated subspace Y1 is no longer singular and does not contain correlated elements. Using this method the effects of near far problem associated with DS-CDMA systems is significantly reduced without using power control mechanisms.

From the foregoing, it is apparent that the present invention substantially improves the convergence rate of the equalization process by performing a partial de-correlation using orthogonal transformation. The partial de-correlation of the received samples identifies and de-correlates strong interfering signals in order to reduce the Eigenvalue ratio. Consequently, the removal of the strong interfering signals from the correlated signal substantially accelerates the convergence rate of the error minimizing LMS or RLS algorithms. The partial de-correlation avoids the excessive time required in having to totally de-correlate the incoming samples. In addition, the partial de-correlation and the algorithms used in the recovery of the incoming signal do not require information on interfering signal parameters nor the identification of signal and noise elements after de-correlation.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a Code Division Multiple Access (CDMA) receiver which utilizes adaptive equalization for minimizing errors between a Direct Sequence Spread Spectrum (DS-SS) signal and a reference signal; a method for optimizing convergence rate and minimizing errors in decoding a received signal comprising the steps of:

a) receiving a DS-SS communication signal including at least one near signal, noise, and a desired DS-SS signal, wherein said desired DS-SS signal comprises binary bits coded with a spreading chip sequence;

b) sampling during a bit interval said received DS-SS communication signal at a chip rate to produce received samples, said received samples being correlated with each other;

c) partially de-correlating the received samples by employing a partial orthogonal transformation algorithm;

d) providing a first subspace having a de-correlated segment associated with the desired DS-SS signal and the at least one near signal;

e) providing a second subspace having a correlated segment associated with noise;

f) adaptively and individually equalizing the first subspace to optimize convergence rate and minimize errors; and g) adaptively and collectively equalizing the second subspace.

2. The method of claim 1, wherein the step of adaptively and collectively equalizing includes the step of updating a number of tap coefficients of a tapped delay line structure.

3. The method of claim 2, wherein the step of updating includes the step of employing Least Mean Square (LMS) algorithm.

4. The method of claim 1, wherein the step of adaptively and individually equalizing includes the step of updating a number of tap coefficients of a tapped delay line structure.

5. The method of claim 4, wherein the step of adaptively and individually equalizing includes the step of employing Recursive Least Square (RLS) algorithm.

6. The method of claim 4, wherein the step of adaptively and individually equalizing includes the step of employing Least Mean Square (LMS) algorithm.

7. The method of claim 1, wherein said step of partially de-correlating comprises the step of employing Gram-Schmidt transformation.

8. The method of claim 1, wherein the step of providing a second subspace includes the step of providing a second subspace having a correlated segment associated with noise and at least one far signal.

9. An adaptive code division multiple access (CDMA) receiver which utilizes adaptive equalization by minimizing errors between a Direct Sequence Spread Spectrum (DS-SS) communication signal and a reference signal, comprising:

means for receiving the DS-SS communication signal, said DS-SS communication signal including at least one near signal, noise, and a desired DS-SS signal, wherein said desired DS-SS signal comprises binary bits coded with spreading chip sequences a despreading means, comprising:

sampling means for sampling, during a bit interval, said received DS-SS communication signal at a chip rate to produce received samples, said received samples being correlated with each other;

de-correlation means for partially de-correlating the received samples by employing an orthogonal transformation algorithm to provide partial de-correlated elements corresponding to said received samples, the de-correlation means comprising:

first means for providing a first subspace having a de-correlated segment associated with the desired DS-SS signal and the at least one near signal;

second means for providing a second subspace having a correlated segment associated with noise;

first adaptive equalizer means for adaptively and individually equalizing the first subspace to optimize convergence rate; and second adaptive equalizer means for adaptively and collectively equalizing the second subspace;

error minimization means responsive to said partially de-correlated elements for minimizing errors between the reference signal and the desired DS-SS communication signal.

10. The receiver of claim 9, wherein the first adaptive equalizer means includes a tap coefficient generator for providing tap coefficients by employing least mean square (LMS) algorithm.

11. The receiver of claim 9, wherein the first adaptive equalizer means includes a tap coefficient generator for providing tap coefficients by employing recursive least square (RLS) algorithm.

12. The receiver of claim 9, wherein the second adaptive equalizer means includes a tap coefficient generator for providing tap coefficients by employing least mean square (LMS) algorithm.

13. The receiver of claim 9, wherein the second means for providing a second subspace includes a de-correlator for providing a second subspace having a correlated segment associated with noise and at least one far signal.

14. In a Code Division Multiple Access (CDMA) receiver which utilizes adaptive equalization for minimizing the error between a received Direct Sequence Spread Spectrum (DS-SS) signal and a reference signal; a method for optimizing convergence rate and minimizing the error in decoding the received signal comprising the steps of:

a) receiving a DS-SS communication signal including at least one near signal, noise, and a desired DS-SS signal, wherein said desired DS-SS signal comprises a training sequence having binary bits coded with a spreading chip sequence;

b) sampling during a bit interval said received DS-SS communication signal at a chip rate to produce received samples, said received samples being correlated with each other;

c) partially de-correlating the received samples by employing a partial orthogonal transformation algorithm;

d) providing a first subspace having a de-correlated segment associated with the at least one near signal;

e) providing a second subspace having a correlated segment associated with the desired DS-SS signal and the noise;

f) adaptively and individually equalizing the first subspace to optimize convergence rate and minimize errors; and g) adaptively and collectively equalizing the second subspace.

15. The method of claim 14, wherein the step of receiving further includes the step of receiving at least one far signal.

16. The method of claim 15, wherein the step of providing a second subspace includes the step of providing a subspace having a correlated segment associated with the desired DS-SS signal, the at least one far signal, and the noise.

17. The method of claim 14, wherein the step of adaptively and individually includes the step of updating tap coefficients of a despreading equalizer using optimal and independent step sizes in adaptively equalizing to the communication signal in order to increase the convergence rate.

18. The method of claim 14, wherein the step of adaptively and collectively includes the step of updating tap coefficients of a despreading equalizer using an optimal step size to accurately decode the received signal.

* * * * *